United States Patent
Karrs et al.

(10) Patent No.: US 7,572,414 B2
(45) Date of Patent: Aug. 11, 2009

(54) MODULAR SYSTEM AND METHOD FOR THE CATALYTIC TREATMENT OF A GAS STREAM

(75) Inventors: Mark Karrs, Lincoln Park, NJ (US); John V. Albano, Oradell, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 1704 days.

(21) Appl. No.: 09/973,401

(22) Filed: Oct. 9, 2001

(65) Prior Publication Data

US 2003/0072693 A1   Apr. 17, 2003

(51) Int. Cl.
 *B01D 50/00* (2006.01)
(52) U.S. Cl. ...................................... 422/168
(58) Field of Classification Search ......... 422/168–183; 60/39.1, 39.02
See application file for complete search history.

(56) References Cited

U.S. PATENT DOCUMENTS

| | | | | |
|---|---|---|---|---|
| 2,936,846 A | * | 5/1960 | Tyler et al. | ............ 181/217 |
| 4,090,812 A | | 5/1978 | Moran | |
| 4,160,009 A | | 7/1979 | Hamabe | |
| 4,160,805 A | | 7/1979 | Inaba et al. | |
| 4,302,431 A | | 11/1981 | Atsukawa et al. | |
| 4,732,743 A | | 3/1988 | Schmidt et al. | |
| 4,778,344 A | | 10/1988 | Water | |
| 4,844,697 A | | 7/1989 | Johansen | |
| 5,043,146 A | * | 8/1991 | Ishikawa et al. | ............ 422/176 |
| 5,047,220 A | | 9/1991 | Polcer | |
| 5,282,355 A | * | 2/1994 | Yamaguchi | ............ 60/39.5 |
| 5,397,545 A | * | 3/1995 | Balling et al. | ............ 422/171 |
| 5,476,378 A | * | 12/1995 | Zagoroff et al. | ............ 432/222 |
| 5,632,142 A | * | 5/1997 | Surette | ............ 60/772 |
| 5,709,088 A | * | 1/1998 | Acaster | ............ 60/624 |
| 6,534,022 B1 | * | 3/2003 | Carlborg et al. | ............ 422/180 |

FOREIGN PATENT DOCUMENTS

IT     EU 0166480     *   6/1984

OTHER PUBLICATIONS

Rogers et al., Numerical Modeling for Design Optimization of SCR Applications, ICAC No. Forum, Washington, D.C. Mar. 23-24, 2000.
PFS—Single Stage Axial Fan, ABB Product Brochure.

* cited by examiner

*Primary Examiner*—Tom Duong
(74) *Attorney, Agent, or Firm*—Dilworth & Barrese, LLP.

(57) ABSTRACT

A system for catalytically treating a gas stream includes a gas phase reactor containing a catalyst for the treatment of the gas stream in at least one catalyst bed having an upstream end and a downstream end, an axial fan positioned upstream of the at least one catalyst bed and having an impeller for moving the gas stream through the gas phase reactor. The gas flow is modified between the impeller and the gas phase reactor to decrease gas stream velocity and increase gas flow uniformity.

46 Claims, 6 Drawing Sheets

MODULAR SYSTEM AND METHOD FOR THE CATALYTIC TREATMENT OF A GAS STREAM

BACKGROUND

1. Field of the Invention

The invention herein relates to a system and method for catalytically treating a gas stream, and particularly to a system and method for catalytically reducing the content of undesirable compounds in a flue gas resulting from the combustion of fuel.

2. Description of the Related Art

Catalytic treatment for modifying the composition of gas streams is well known in the art. Various types of catalyst beds have been used such as fixed beds and fluid beds. Among fixed beds there are axial flow reactors, radial flow reactors and parallel flow reactors.

Environmental concerns and new regulations are motivating further research and development in the treatment of gas streams to reduce the content of pollutants such as nitrogen oxides ($NO_x$) and sulfur oxides ($SO_x$) from the exhaust gases resulting from combustion processes such as engine or turbine exhaust gases, or furnace stack gas. Such gases can result from the operation of power plants, thermal cracking furnaces, incinerators, internal combustion engines, metallurgical plants, fertilizer plants, chemical plants, and other industrial operations.

For example, processes for selectively reducing the $NO_x$ content of flue gas are known. Generally such processes employ the reaction of $NO_x$ with a reducing agent, such as ammonia or urea, optionally in the presence of a catalyst. The reduction of $NO_x$ with ammonia can be performed catalytically at a temperature generally ranging from about 500° F. to about 950° F. in a process known as selective catalytic reduction ("SCR").

One problem associated with the catalytic treatment of large volumes of gas is providing an even distribution of the gas across the face of the catalyst, and an even mixing of the flue gas with the reducing agent. As can be readily appreciated, uneven distribution reduces the efficiency of the system. Reduced efficiency, in turn, requires the use of larger catalyst beds.

The weight and bulk of the equipment necessary to achieve satisfactory removal of $NO_x$ is yet another important factor. Many industrial plants need to be retrofitted with $NO_x$ removal ("deNOx") or $SO_x$ removal ("deSOx") equipment in order to meet the requirements of more stringent government regulations. However, because of the physical bulk of the deNOx/deSOx systems, the flue gas must be diverted to ground level for treatment and then sent back to the stack for subsequent exhaust to the atmosphere. It would be advantageous to provide a relatively lightweight deNOx and/or deSOx unit which can be incorporated directly into the stack. It can readily be appreciated that better system efficiency, and the consequent reduced bulk of the deNOx and/or deSOx system, is advantageous in providing a stack reactor system suitable for mounting to a stack.

SUMMARY OF THE INVENTION

In accordance with the present invention a system is provided herein for catalytically treating a gas stream, the system comprising:

a) a gas phase reactor containing a catalyst for the treatment of the gas stream in at least one catalyst bed having an upstream end and a downstream end, and;

b) an axial fan positioned upstream of the at least one catalyst bed and having a rotatable impeller for moving the gas stream through the gas phase reactor; and, c) gas flow modification means positioned between the impeller and the gas phase reactor for decreasing gas stream velocity and increasing gas flow uniformity.

The system advantageously provides increased efficiency by rendering the velocity profile of the gas stream more uniform before it enters the reactor and preventing uneven flow through the catalyst bed. Furthermore, the uniformity of the composition of the gas stream is also increased.

BRIEF DESCRIPTION OF THE DRAWINGS

Various embodiments are described below with reference to the drawings wherein.

DETAILED DESCRIPTION OF PREFERRED EMBODIMENT(S)

As used herein the terms "stack" and "flue" are used synonymously. The term "nitrogen oxide" as used herein refers to any oxide of nitrogen such as, for example, NO, $NO_2$, $N_2O_4$ or $N_2O$, and is alternatively designated as $NO_x$. The term "sulfur oxide" refers to any oxide of sulfur such as, for example, $SO_2$ or $SO_3$, and is alternatively designated as $SO_x$.

While the present invention is particularly exemplified by its embodiment in a stack gas treatment system, any catalytic treatment of any gas stream is contemplated as being within the scope of the invention.

The present invention is advantageously used in conjunction with the treatment of exhaust gas resulting from a high temperature combustion process, for example, turbine exhaust or fired heater stack gas. The increased efficiency achieved by the present invention is particularly advantageous with respect to deNOx and/or deSOx systems.

Figure 1:
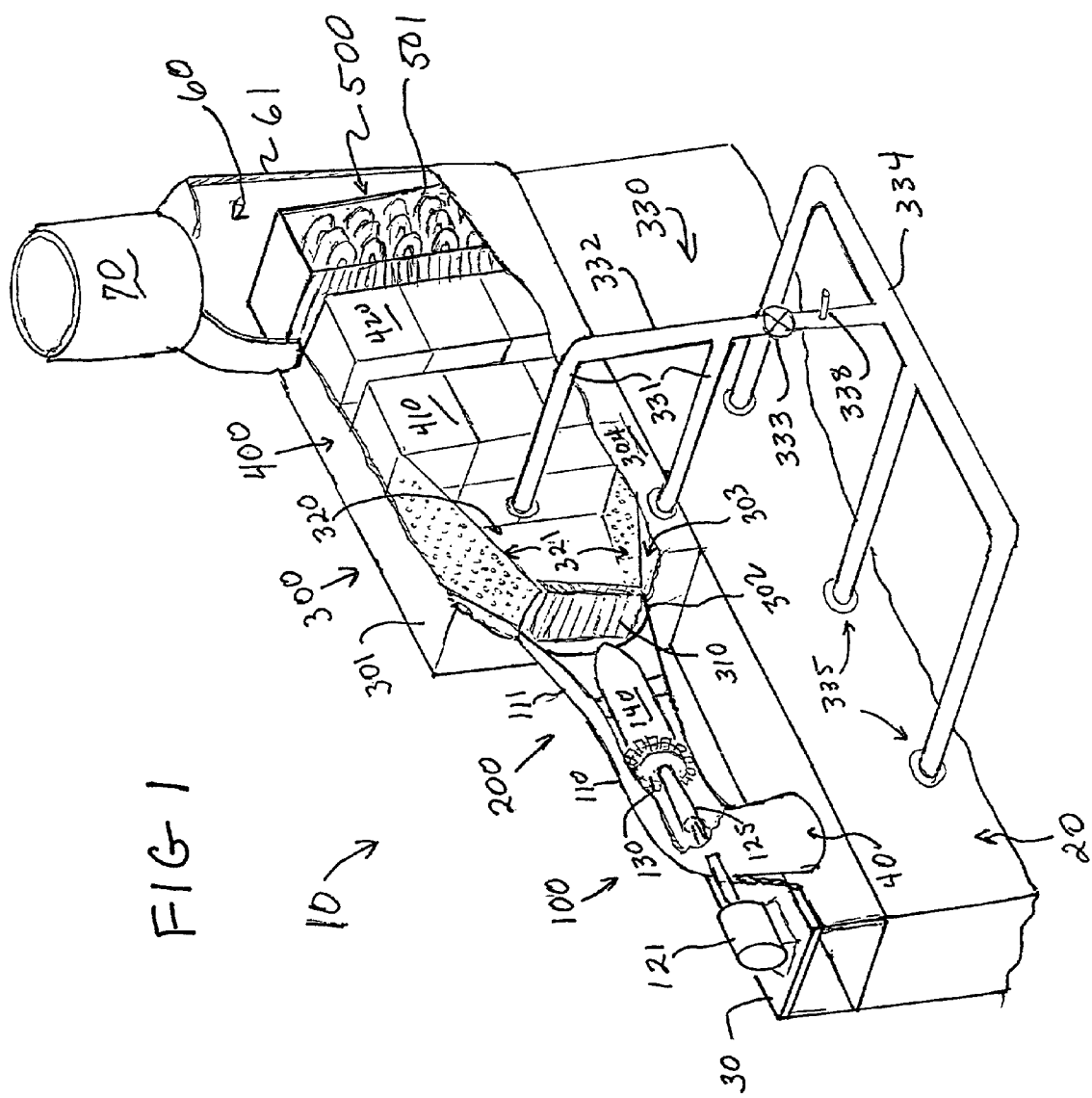
FIG. 1 is a diagrammatic perspective view of the system of the present invention.

Referring now to FIG. 1, a system 10 for the catalytic treatment of a gas stream is shown. The system is illustrated in conjunction with the SCR deNOx treatment of a flue gas from the convection section 20 of a fired heater such as a thermal cracking unit. Such thermal cracking units are well known in the art and, for example, are typically used to produce olefins from saturated hydrocarbon feedstocks such as ethane, propane, naphtha, and the like.

SCR is often employed to reduce the $NO_x$ content of a flue gas by reacting the $NO_x$ component with a reducing agent such as ammonia, urea, or alkyl amines and the like, in the presence of a catalyst to produce nitrogen and water as shown in the following chemical equation (not stoichiometrically balanced):

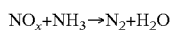

$$NO_x + NH_3 \rightarrow N_2 + H_2O$$

The flue gas generated by a thermal cracker furnace typically includes the following components:

| | |
|---|---:|
| Nitrogen | 60-80 vol. % |
| Oxygen | 1-4 vol. % |
| Water vapor | 10-25 vol. % |
| Carbon dioxide | 2-20 vol. % |
| Nitrogen oxide | 50-300 ppm. |

The reducing agent, preferably ammonia, is injected into a flue gas recycle stream (discussed below) and introduced into the convection section 20. The flue gas with reducing agent exits the convection section 20 through duct 40 at a temperature ranging from about 400° F. to about 700° F., and is moved by means of an axial fan system 100. A high temperature axial fan suitable for use in the present system is available from ABB Fan Group Inc., of Niles, Mich. under the model designation PFS-14-095-21 TG. While the system 10 is configured for generally horizontal flow of the flue gas through the system, other orientations such as vertical or inclined can alternatively be employed if desired.

Figure 2:
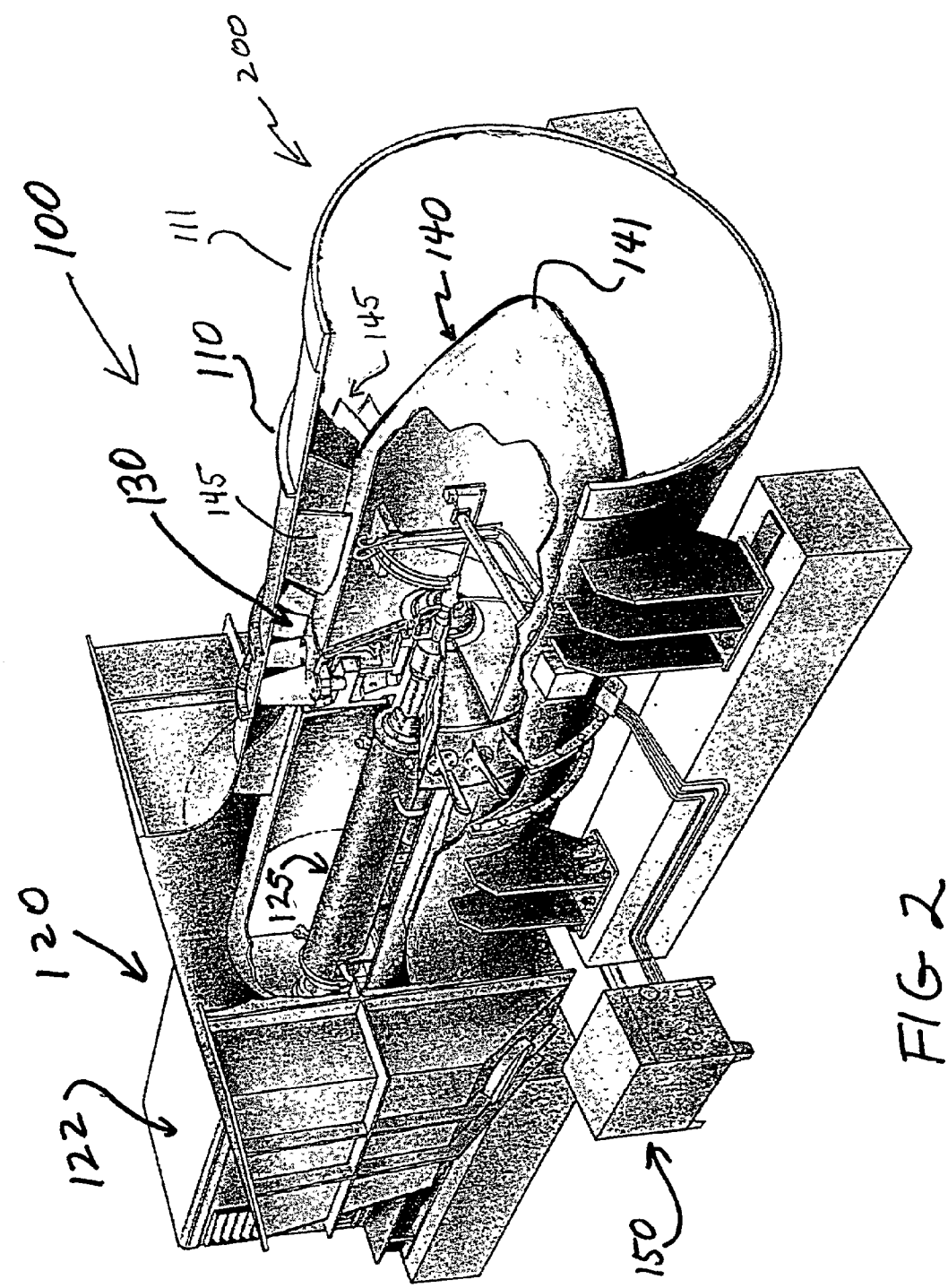
FIG. 2 is a cutaway perspective view of the fan system of the present invention.
Figure 3:
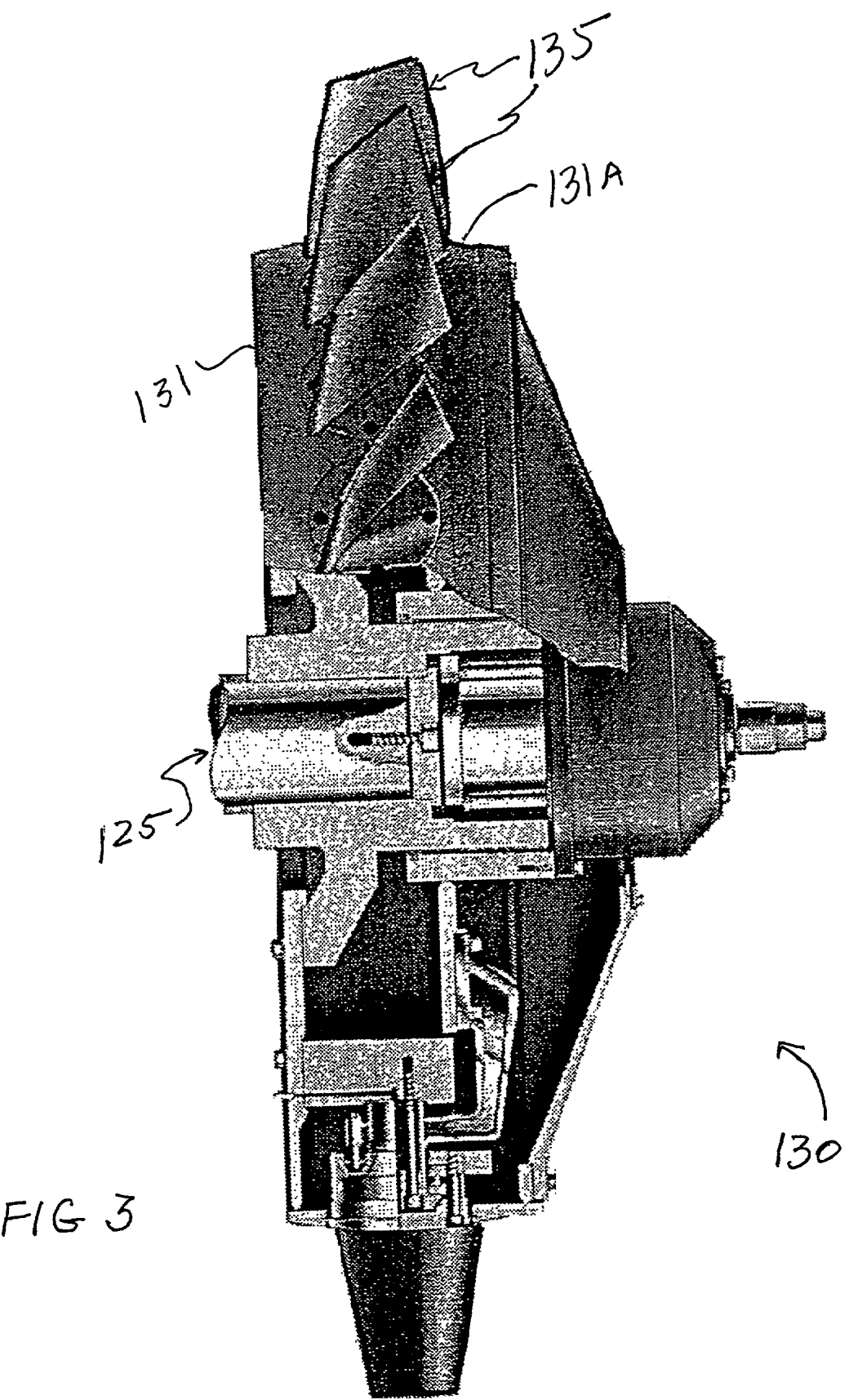
FIG. 3 is a cut away side view of an impeller assembly employed in the fan system of the present invention.

Referring now to FIGS. 1, 2 and 3, a preferred fan system 100 is mounted to a platform 30 above the convection section 20 of a thermal cracking furnace or other similarly configured heater. Fan system 100 includes a drive unit 120, fan housing 110 for enclosing an impeller assembly 130 and tail cone 140, and a control unit 150.

More particular, drive unit 120 includes a drive motor 121 (FIG. 1) enclosed within a motor housing 122 (FIG. 2), and a rotatable axial shaft 125 for transmitting rotary motion to an impeller assembly 130. The motor 121 is sized for adequate movement of the flue gas. In a preferred embodiment motor 121 has a rated output of 250 HP at 1800 rpm, and operates at 316 amps/480 volts and on a 60 cycle current. The present fan system 100 is adapted to handle flue gas throughput of up to about 300,000 lbs/hr efficiently.

Other size motors can be used in accordance with desired flue gas loads. Selecting an appropriately sized motor and fan is within the purview of those with skill in the art.

Referring to FIG. 3, the impeller assembly 130 is attached to shaft 125 and includes a rotor 131, and a plurality of blade units 135 removably and adjustably fixed to the circumferential periphery of the rotor 131. The. blade units can possess single or, preferably, twin blades.

Figure 4:
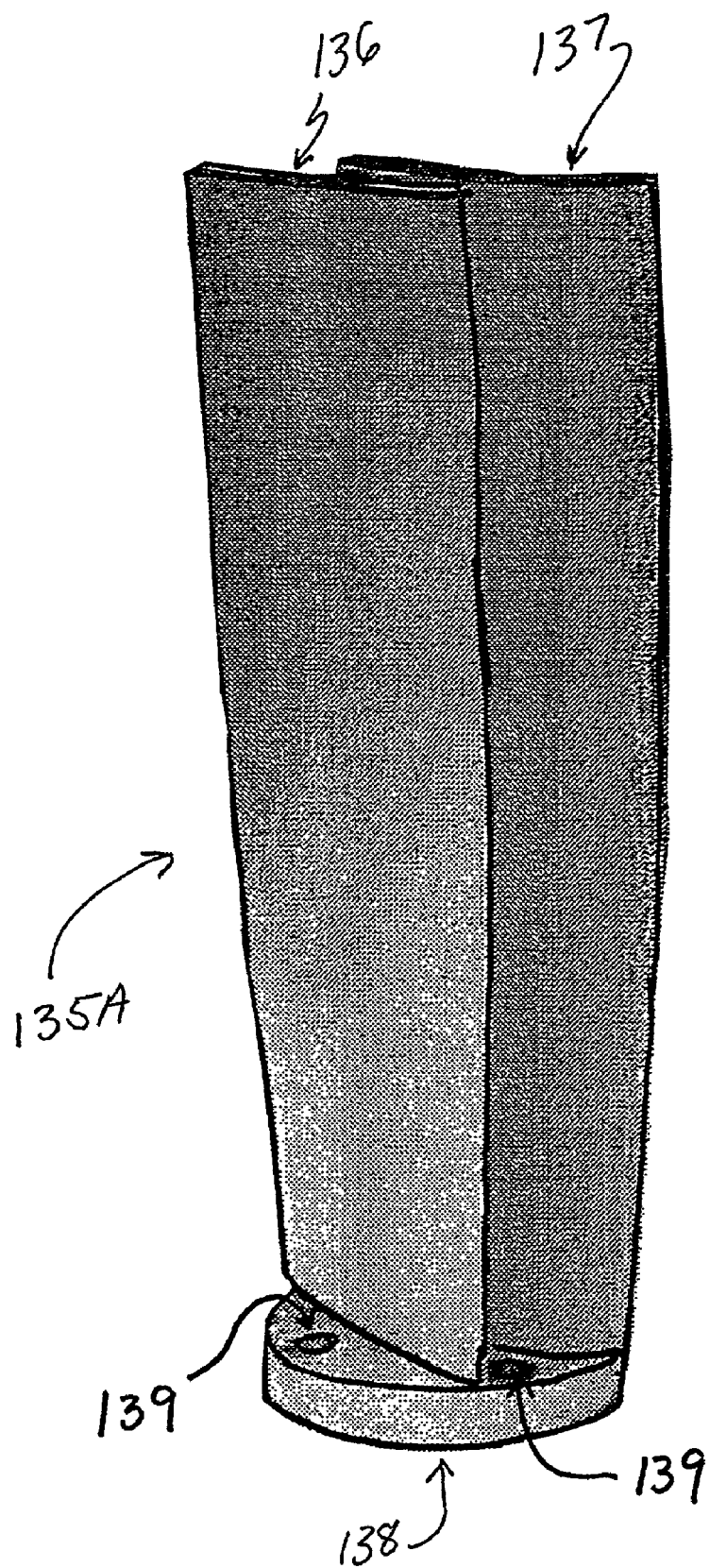
FIG. 4 is a perspective view of a twin blade unit for use in the impeller assembly.

Referring to FIG. 4, a preferred twin blade unit 135A includes a disc shaped base 138 from which substantially parallel blades 136 and 137 extend. The base 138 includes apertures 139 through which bolts or screws may be disposed for attachment to the circumferential periphery 131A of rotor 131. The blade units 135 and 135A are preferably fabricated from steel and are of single piece monolithic construction. The pitch of the blade units may be individually adjusted to provide optimal blade angles for desired performance.

The present invention advantageously provides a great deal of flexibility in choosing suitable methods for controlling the system 10. For example, one method of controlling flue gas velocity and throughput is in-flight variable pitch control of the angle of the blade units 135 while the fan is operating. Systems for in-flight variable pitch control are known. See e.g., U.S. Pat. Nos. 4,090,812, 4,778,344 and 4,844,697, all of which are incorporated by reference. A second option for in-flight control is to vary the speed of impeller rotation, faster speed producing high gas velocity and throughput. Another alternative is to use individually adjustable blade units which can be manually adjusted when the fan is stopped to provide a desirable blade pitch. Yet another means of controlling gas flow through the catalyst beds is by means of spill back control, i.e., control of the recycle flow of flue gas. Spill back control is discussed in more detail below with reference to the recycle manifold 330.

A significant feature of the present invention is the uniformity of the gas flow entering the catalyst beds. Conventional fan systems such as radial fans and unmodified axial fans produce a high velocity exhaust which has an uneven velocity profile. This results in uneven and inefficient use of catalyst, and therefore requires a greater bed volume to achieve the desired conversion of $NO_x$. If the kinetic energy of the flue gas in the duct feeding the catalyst modules is high relative to the module pressure drop (for example, a kinetic energy greater than approximately 20% of the bed pressure drop) maldistribution will occur and the required deNOx efficiency will not be achieved. The ratio of the catalyst module pressure drop to inlet kinetic energy should be as high as possible. This will minimize dynamic effects and assure proper flow distribution if the flow characteristics of the catalyst modules themselves and downstream heat economizer tubes are uniform. With low pressure drop catalyst beds the associated kinetic energy of the catalyst bed inlet stream must be very low. This means that the exhaust from the fan must be decelerated and the kinetic energy of the exhaust must be reduced. Conventional design methods prescribe the use of long sections of duct with gradually increasing cross sectional area (also known as evase ducting) to decelerate the flow and convert the kinetic energy of the fan exit stream to static pressure. Also, the exhaust gas acquires a "swirl", or spinning component of velocity from the rotary motion of the impeller. The swirl must be converted to axial flow.

A characteristic of the present system is the evenness of the flue gas velocity profile. The flue gas stream entering the catalyst beds should have variations in gas velocity of no more than about 10% deviation from the average velocity, and preferably no more than about 5% deviation from average velocity. The average or mean velocity is defined as the total volumetric flow divided by the cross sectional flow area of the approach duct. Likewise, the content of the reducing agent should be as uniform as possible, which can be achieved by more effective mixing, as discussed below.

In order to achieve more even flow of flue gas the fan system 100 includes a gas flow modification section 200 for decreasing the flue gas velocity and flattening the velocity profile of the gas. The gas flow modification section 200 includes a generally cylindrical, longitudinally extending tail cone 140 having a distally pointing tapered end portion 141 with a generally conical shape. The tail cone 140 is supported by longitudinally oriented planar struts 145 positioned in the annular space between the tail cone 140 and the interior surface of the housing 110. The planar struts 145 not only help support the tail cone 140 but also act as baffles to reduce the gas flow swirl and redirect the spinning component of the gas velocity towards axial flow of the flue gas through the system.

The housing 110 has a distal end section 111 which flares outward in diameter such that the exit diameter of the housing 110 is greater than the diameter at the impeller. As can be seen, the cross-sectional area of the annular space between the tail cone 140 and the housing 110 is the area available for gas flow. The combined reduction of the diameter of the tail cone 140 at tapered end 141 and the increasing diameter of the housing at flared section 111 forms an annular diffuser which increases the cross sectional area available for gas flow and thereby reduces the velocity of the gas and tends to flatten the velocity profile of the gas.

Referring now to FIG. 1, the transition section 300 is positioned between the gas flow modification section 200 of the fan system and the gas phase reactor 400, and is adapted to redirect and distribute the flow of the flue gas evenly across the face of the catalyst bed 410. Transition section includes a housing 301 defining an interior chamber for enclosing a guide vane unit 310, and transition duct 320. Guide vane unit 310 is positioned at or near the inlet 302 of the transition section and includes louvers for redirecting the flow of flue gas. Guide vane units suitable for use in the transition section 300 are commercially available and those skilled in the art can readily select an appropriate guide vane unit for a particular application. The guide vane unit 310 further decelerates the flue gas flow and redirects the flue gas outward from the axial centerline of the flow so as to spread the flue gas flow evenly over the proximal face of the catalyst bed 410. The transition duct 320 includes walls 321 which are perforated in the direction of the longest flow paths. The perforations serve to permit boundary layer suction to be applied to the panels, thereby preventing flow separation and increasing diffuser efficiency and improving flow uniformity. The boundary layer fluid is withdrawn through the perforations in the walls 321 into a proximal portion 303 of the chamber defined by housing 301 and is drawn into recycle manifold 330.

The gas flow modification section 200 and transition section 300 both provide means for modifying the gas flow through system 10 in order to accomplish one or more of: decelerating the gas, reducing swirl, flattening the velocity profile, and directing the gas evenly across the face of the catalyst bed. These gas flow modifications are achieved by expanding the cross-sectional area available to gas flow, and the use of guide vanes, baffles, and other such surfaces for orienting the flow direction of the gas.

Recycle manifold 330 includes one or more pipe branches 331 extending from the side wall 304 of housing 301 for drawing flue gas from the proximal portion 303 of the chamber. The pipe branches 331 connect to a pipe main 332. Ammonia, or other reducing agent, is injected into the pipe main 332 at inlet 338. The recycled flue gas is directed through horizontal distributor pipe 334 and return pipes 335. The return pipes 335 are laterally spaced apart and provide a return flow of recycled flue gas into multiple regions of the convection section 20. A valve 333 is a means for controlling the recycling of flue gas and thereby provides spill back control for the system 10. The recycling of the flue gas helps to reduce fluctuations in the ammonia content of the flue gas entering the catalyst bed by more thoroughly distributing the ammonia. The fluctuation of the ammonia content of the gas is no more than about 10% deviation from the average ammonia content, preferably no more than 5% deviation, and more preferably no more than 3% deviation from the average value of the ammonia content.

Figure 6:
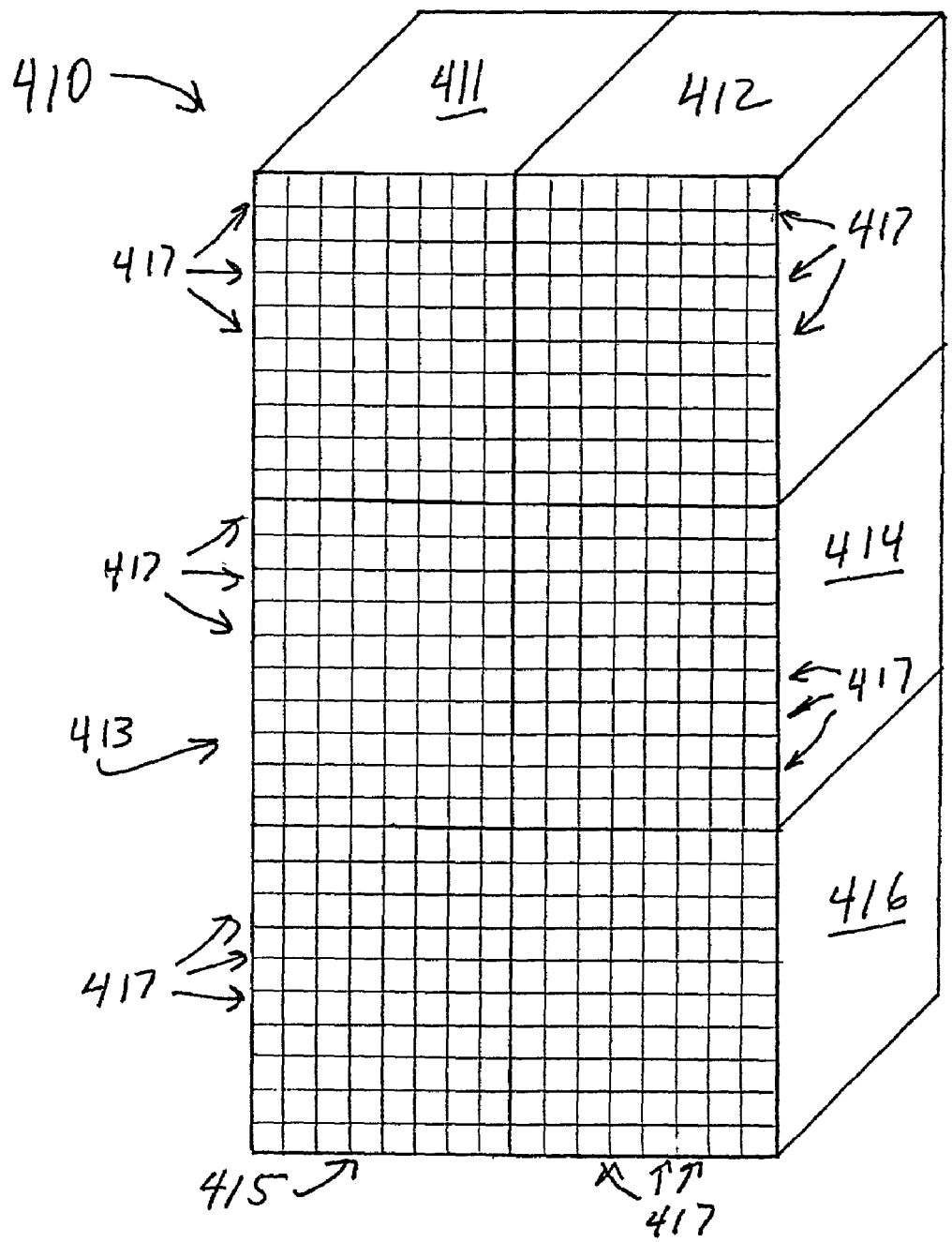

Referring now to FIGS. 1 and 6 the advantageous features of the present invention are particularly suited to the axial flow reactor system described below. The preferred gas phase reactor system 400 includes two catalyst beds 410, 420 which are preferably positioned in series. Each catalyst bed includes a plurality of catalyst modules, and each module includes a plurality of catalyst elements.

Catalysts for the selective reduction of nitrogen oxides in the presence of a reducing agent are known in the art. Representative examples of such catalysts include, but are not limited to, oxides of vanadium, aluminum, titanium, tungsten and molybdenum. Zeolites can also be used. Examples of the latter include ZSM-5 modified with protons, or with copper, cobalt silver, zinc, or platinum cations or their combination. It is to be understood that the scope of the present invention is not limited to a specific SCR catalyst or catalyst composition.

Figure 5:
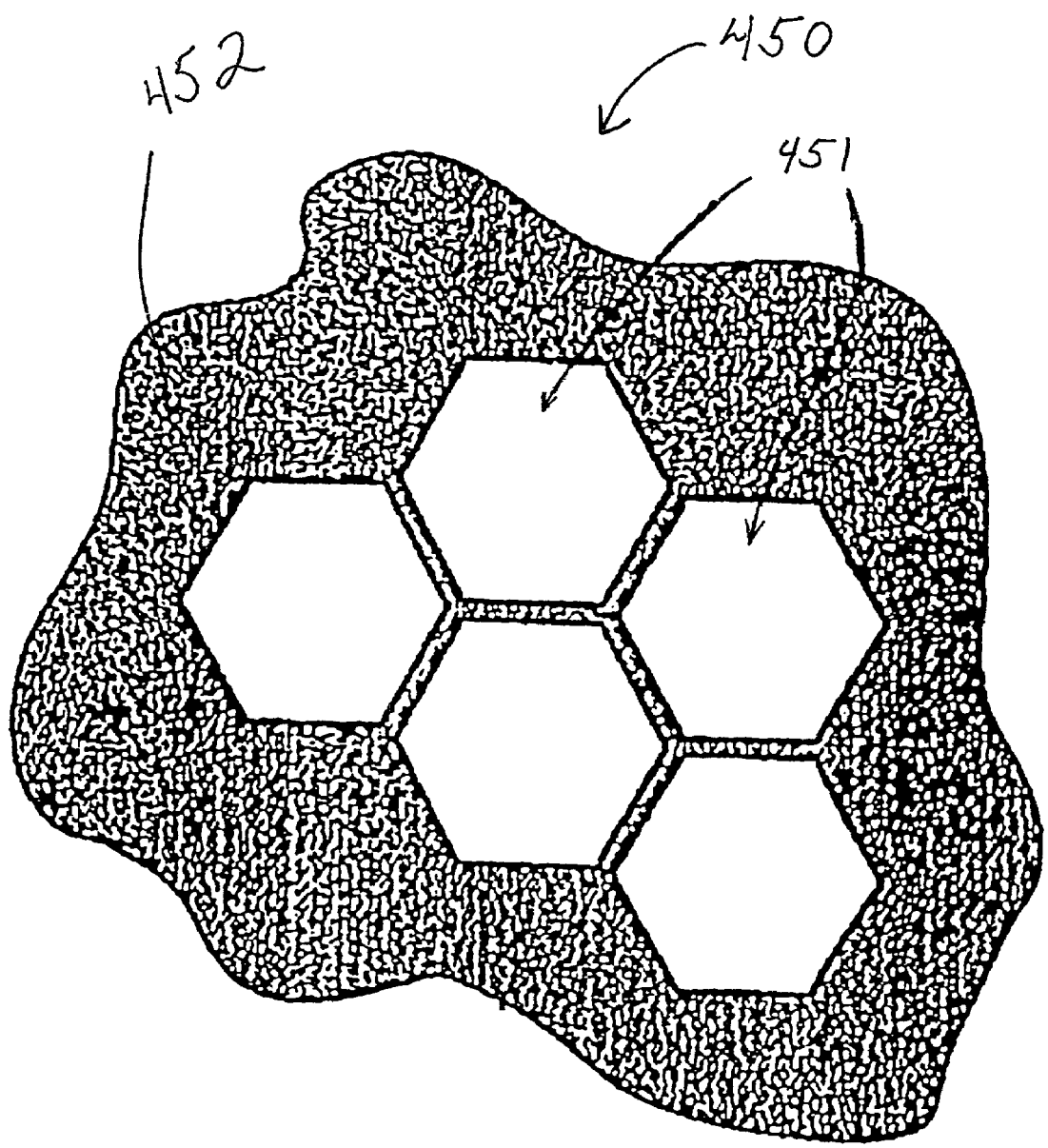
FIG. 5 illustrates a honeycomb catalyst structure useful in the gas phase reactor of the present invention; and, FIG. 6 is a diagrammatic view of a catalyst bed for use in the reactor system of the present invention.

A preferred catalyst for $NO_x$ removal for use in the present system is vanadium pentoxide ($V_2O_5$) on a titanium dioxide ($TiO_2$) support. The catalyst is optionally provided as a honeycomb catalyst. Honeycomb catalysts are known in the art. Referring to FIG. 5, honeycomb catalyst 450 includes a monolithic catalyst body 452 containing a plurality of parallel passageways 451, which are preferably hexagonal in cross-sectional shape. The gas stream to be catalytically treated is moved through the passageways 451. Alternatively, the passageways can possess a circular cross-section or other shape such as square, rectangular and the like.

Another catalyst suitable for use in the present system is a microengineered catalyst ("MEC") supported on a mesh-like support having at least about 85% void space. The mesh-like support of the MEC catalyst can include wires, metal felt, metal gauge, metal fiber filter or the like, and can include one or more layers. The catalyst (e.g., $V_2O_5$, with or without $TiO_2$ or other support) can be coated onto the mesh by a variety of techniques such as dipping, spraying, etc. in an amount sufficient to achieve the desired conversion of $NO_x$. A MEC catalyst suitable for use in the present invention is described in copending U.S. Patent application Ser. No. 60/222,261 filed Jul. 31, 2000, entitled "Conversion of Nitrogen Oxides in the Presence of a Catalyst supported on a Mesh-Like Structure" the contents of which are incorporated by reference herein in their entirety.

In the system 10 herein, the catalyst beds are oriented for horizontal flow of the flue gas therethrough. FIG. 6 illustrates the structure of catalyst bed 410, catalyst bed 420 being of the same structure. Catalyst bed 410 includes six stackable, separable individual modules 411, 412, 413, 414, 415, and 416. Each module includes a plurality of catalyst elements 417, preferably arranged in an 8×10 configuration. In a preferred embodiment each catalyst element has dimensions of 160 mm×160 mm×1205 mm. The entire bed 410 has dimensions of 4.80 meters×2.56 meters×1.205 meters. The modular construction of the reactor system 400 facilitates the removal and/or replacement of the catalyst beds 410 and 420, or individual modules thereof.

The catalyst beds are preferably operated at a temperature of from about 400° F. to about 700° F., more preferably from about 500° F. to 600° F., and most preferably from about 550° F. to about 570° F. The pressure drop through each catalyst bed preferably can range from about 1 inch to about 5 inches, more preferably from about 2 inches to about 4 inches, and most preferably from about 3 inches to 3.5 inches.

The gas exiting the reactor section 400 has a reduced content of $NO_x$. At least a 90% reduction of $NO_x$ content is achieved, preferably at least a 93% reduction of $NO_x$ content is achieved, and more preferably at least a 95% reduction of $NO_x$ content is achieved.

The treated flue gas enters the heat recovery section 500 and flows through an array of tubes 501. The cracker feedstock can be used as the heat recovery fluid, thereby maintaining the overall temperature and duty profile of the furnace while cooling the flue gas from the range of 400° F.-700° F. to the range of 300° F.-400° F. Other streams, such as Boiler Feed Water to steam generation equipment can alternatively be used to cool the treated flue gas and improve the thermal efficiency of the operation. The tubes 501 can alternatively be positioned in a horizontal orientation or a vertical orientation depending upon whether the cooling fluid flowing through tube 501 is vaporized by passage therethrough, or is already in a gaseous phase.

The treated and cooled flue gas thereafter enters a duct 60 with a side surface 61 which is tapered so as to maintain a constant static pressure at the outlet of the heat recovery section 500. The flue gas is thereafter diverted to upward flow through stack 70 into the atmosphere.

The system 10 for the catalytic treatment of flue gas is exemplified by the Example set forth below.

EXAMPLE

A system for the catalytic treatment of flue gas as illustrated in FIG. 1 is provided.

A flue gas is generated by a thermal cracking furnace at the rate of 272,370 lb/hr, the flue gas containing the following components:

| | |
|---|---|
| $O_2$ | 6.00 vol. % |
| $N_2$ | 72.82 vol. % |
| $H_2O$ | 14.88 vol. % |
| $CO_2$ | 6.30 vol. % |
| $NO_x$ | 30.00 lb/hr |

Anhydrous ammonia is added to the flue gas via the recycle grid. The ammonia flow rate to the reactor is 10.8 lb/hr.

The flue gas is moved horizontally by means of the fan system described above and passes through the diffuser and transition duct into the reactor containing two modular catalyst beds in series. The catalyst for the reactor section is vanadium pentoxide on titanium dioxide honeycomb catalyst positioned for horizontal flow. The catalyst bed is operated at a temperature of 560° F. The flue gas experiences a pressure drop of 3.0" $H_2O$ across the reactor. At the reactor exit the treated flue gas has a $NO_x$ concentration of only 2.5 lb/hr. This represents a $NO_x$ reduction efficiency of about 91.7% based on the inlet $NO_x$ concentration of 30 lb/hr. An ammonia slip of 5 ppm is observed.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. A system for catalytically treating a gas stream, which comprises:
    a) a gas phase reactor containing a catalyst for the treatment of the gas stream in at least one catalyst bed having an upstream end and a downstream end;
    b) an axial fan positioned upstream of the at least one catalyst bed and having a rotatable impeller for moving the gas stream through the gas phase reactor; and,
    c) gas flow modification means positioned between the impeller and the gas phase reactor for decreasing gas stream velocity, and increasing gas flow uniformity.

2. The system of claim 1 wherein the gas flow uniformity is increased by the gas flow modification means such that the gas stream entering the gas phase reactor has a velocity profile exhibiting not more than about 10% velocity deviation from an average gas stream velocity at the upstream end of the at least one catalyst bed.

3. The system of claim 2 wherein the velocity profile of the gas stream exhibits no more than about a 5% velocity deviation from an average gas stream velocity at the upstream end of the at least one catalyst bed.

4. The system of claim 1 wherein the axial fan includes a housing and a tail cone, and the gas flow modification means includes a distally pointing tapered end portion of the tail cone and a flared portion of the housing having a gradually increasing diameter.

5. The system of claim 4 wherein the gas flow modification means further includes a transition duct having perforated walls which flare outward so as to gradually increase cross-sectional area available to gas stream flow.

6. The system of claim 4, wherein the gas flow modification means further comprises:
    a transition duct having perforated walls that flare outward positioned downstream from the housing; and,
    a guide vane unit disposed at an inlet of the transition duct, wherein the guide vane unit includes louvers for redirecting the flow of the flue gas.

7. The system of claim 1 wherein the gas flow modification means includes a transition duct having perforated walls which flare outward so as to gradually increase cross-sectional area available to gas stream flow.

8. The system of claim 7, wherein the gas flow modification means further comprises:
    a transition duct having perforated walls that flare outward positioned downstream from the housing; and,
    a guide vane unit disposed at an inlet of the transition duct, wherein the guide vane unit includes louvers for redirecting the flow of the flue gas.

9. The system of claim 1 further including means for recycling a portion of the gas stream from downstream of the axial fan to a position upstream of the axial fan.

10. The system of claim 1 wherein the gas stream contains nitrogen oxide.

11. The system of claim 1 wherein the catalyst bed includes a plurality of stackable, individually separable modules containing one or more materials selected from the group consisting of vanadium oxide, aluminum oxide, titanium oxide, tungsten oxide, molybdenum oxide and zeolite.

12. The system of claim 11 wherein the modules each comprise a plurality of stacked catalyst elements having a honeycomb type structure.

13. The system of claim 1 wherein the catalyst bed comprises a catalyst supported on a mesh-like structure having a void space of at least about 85%.

14. The system of claim 1 wherein the catalyst bed includes a vanadium pentoxide catalyst on titanium oxide support.

15. The system of claim 1 wherein the gas phase reactor comprises at least two catalyst beds arranged in series.

16. The system of claim 1 wherein the fan impeller includes a plurality of blade units attached to and extending radially outward from a circumferential periphery of the impeller.

17. The system of claim 16 wherein the blade units each comprise two blades.

18. The system of claim 16 wherein the blade units have a variable pitch which is controllable while the impeller is rotating.

19. The system of claim 16 wherein the impeller has a variable speed of rotation which is adjustable while the impeller is rotating.

20. The system of claim 1 further including a heat recovery section positioned downstream of the gas phase reactor for cooling the gas stream.

21. The system of claim 1 further including means for introducing reducing agent into the gas stream.

22. The system of claim 21 further including a gas stream recycle manifold for communicating a portion of the gas stream downstream of the axial fan to a convection section of a furnace positioned upstream of the axial fan, wherein the means for introducing reducing agent comprises an inlet for introducing the reducing agent into the gas stream recycle manifold.

23. The system of claim 1, wherein the gas flow modification means comprises:

a housing including a tail cone, wherein the housing surrounds the axial fan, and wherein the tail cone is positioned downstream from the axial fan; and, a transitional duct having perforated walls that are flared outward disposed downstream from the housing.

24. The system of claim 23, wherein the tail cone has a substantially conical shape and comprises a distally pointing tapered end portion.

25. The system of claim 24, wherein the tail cone is supported within the housing by longitudinally oriented planar struts positioned in an annular space between the tail cone and an interior surface of the housing, wherein the struts act as baffles to reduce swirl and direct gas flow towards an axial flow of the flue gas through the system.

26. The system of claim 23, wherein the housing further comprises:

an outlet, wherein a diameter of the outlet is greater than a diameter of an impeller of the axial fan, and wherein the circumference of the housing gradually increases from a position of the housing at the axial fan to the outlet of the housing.

27. The system of claim 23, wherein the gas flow modification means further comprises a guide vane unit disposed at an inlet of the transition duct, wherein the guide vane unit includes louvers for redirecting the flow of the flue gas.

28. A system for catalytically treating a furnace flue gas, which comprises:

a) a gas phase reactor containing a catalyst for the treatment of the flue gas in at least one catalyst bed having an upstream end and a downstream end;

b) an axial fan positioned upstream of the at least one catalyst bed and downstream of a furnace and having a rotatable impeller for moving the flue gas from the furnace through the gas phase reactor; and, c) means for recycling a portion of the flue gas from downstream of the axial fan to a convection section of the furnace located upstream of the axial fan.

29. The system of claim 28 wherein the means for recycling a portion of the flue gas comprises a gas stream recycle manifold.

30. The system of claim 29 wherein the gas stream recycle manifold includes an inlet for introducing reducing agent into recycle manifold.

31. The system of claim 29 wherein the gas stream recycle manifold includes a control valve.

32. The system of claim 29 further comprising a transition duct having perforated walls which flare outward so as to gradually increase cross-sectional area available to flue gas flow.

33. The system of claim 32 wherein the gas stream recycle manifold has at least one inlet connected to the transition duct, and at least one outlet connected to the convection section of the furnace.

34. The system of claim 28 wherein the axial fan includes a housing and a tail cone, the housing having a flared distal portion and the tail cone having a distally pointing tapered end portion.

35. The system of claim 34, wherein the gas flow modification means further comprises:

a transition duct having perforated walls that flare outward positioned downstream from the housing; and, a guide vane unit disposed at an inlet of the transition duct, wherein the guide vane unit includes louvers for redirecting the flow of the flue gas.

36. The system of claim 28 wherein the catalyst bed includes a plurality of stackable, individually separable modules containing one or more materials selected from the group consisting of vanadium oxide, aluminum oxide, titanium oxide, tungsten oxide, molybdenum oxide and zeolite.

37. The system of claim 36 wherein the modules each comprise a plurality of stacked catalyst elements having a honeycomb type structure.

38. The system of claim 28 wherein the catalyst bed comprises a catalyst supported on a mesh-like structure having a void space of at least about 85%.

39. The system of claim 28 wherein the flue gas contains nitrogen oxide.

40. The system of claim 39 wherein the at least one catalyst bed includes a vanadium pentoxide catalyst on titanium oxide support.

41. The system of claim 28 wherein the gas phase reactor comprises at least two catalyst beds arranged in series.

42. The system of claim 28 wherein the fan impeller includes a plurality of blade units attached to and extending radially outward from a circumferential periphery of the impeller.

43. The system of claim 42 wherein the blade units each comprise two blades.

44. The system of claim 42 wherein the blade units have a variable pitch which is controllable while the impeller is rotating.

45. The system of claim 42 wherein the impeller has a variable speed of rotation which is adjustable while the impeller is rotating.

46. The system of claim 28 further including a heat recovery section positioned downstream of the gas phase reactor for cooling the flue gas.

* * * * *

UNITED STATES PATENT AND TRADEMARK OFFICE
CERTIFICATE OF CORRECTION

PATENT NO.       : 7,572,414 B2                                       Page 1 of 1
APPLICATION NO.  : 09/973401
DATED            : August 11, 2009
INVENTOR(S)      : Karrs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1941 days.

Signed and Sealed this

Fourteenth Day of December, 2010

David J. Kappos
*Director of the United States Patent and Trademark Office*